UNITED STATES PATENT OFFICE.

JOHN J. DOMKE, OF GREELEY, COLORADO.

CEMENT FOR STONEWORK.

1,234,306.     Specification of Letters Patent.     Patented July 24, 1917.

No Drawing.     Application filed June 19, 1916. Serial No. 104,425.

*To all whom it may concern:*

Be it known that I, JOHN J. DOMKE, a citizen of the United States, and a resident of Greeley, in the county of Weld and State of Colorado, have invented a new and useful Improvement in Cements for Stonework, of which the following is a description.

The invention relates to improvements in cementitious compositions such as are employed in the setting of stonework, and it has for its object the production of a cement that is particularly adapted to monumental work in which the stone blocks are closely fitted together and require a fine smooth binding material to form the joints and to close the crevices.

The principal ingredients of the composition are whiting, white lead, ground stone, varnish and linseed oil. The whiting is in the form of chalk dried, ground, levigated, and then again ground so that the resulting product is a fine impalpable powder. The white lead and stone are also ground so that they are entirely free from grit or coarse particles. The varnish and linseed oil are the ordinary articles of commerce that have been freed from all sediment and coarse particles.

In the composition the whiting acts as a filler to give bulk, as does the ground stone, and the latter also imparts strength so that the hardened composition will withstand any crushing strain to which it might be subjected. The white lead, together with the linseed oil, forms a protective coating for the particles of whiting and ground stone to preserve the composition against adverse weather conditions. The varnish acts principally as the vehicle to carry the solid particles of the composition while the latter is in a semiliquid or plastic form; the varnish also acts as a drier to insure a quick setting or hardening of the composition when the latter is in place between the stone blocks. To these principal ingredients is added a finely ground mineral color to adapt the composition to the texture of the stone-work. A small quantity of water may be added to keep the composition moist while contained in the closed receptacles in which it is placed on the market.

The different ingredients are thoroughly mixed together to form a smooth homogeneous mass. The cement is put up in sealed cans ready for use.

The proportions of the different ingredients in the composition in a hundred parts, according to weight, are as follows: whiting, 30 parts; varnish, 25 parts; white lead, 20 parts; ground stone, 10 parts; linseed oil, 10 parts; mineral color, 3 parts; and water, 2 parts. These proportions, however, may be varied to meet different requirements.

Having thus described my invention, what I claim and desire to secure by Letters Patent is—

A cementitious composition for stonework comprising a mixture of thirty parts of whiting, twenty parts of ground white lead, ten parts of ground stone, twenty-five parts of varnish; ten parts of linseed oil, and three parts of mineral color.

In testimony whereof I hereunto affix my signature in the presence of two witnesses.

JOHN J. DOMKE.

Witnesses:
    R. E. SHOTWELL,
    L. M. SAVAGE.

*Copies of this patent may be obtained for five cents each, by addressing the "Commissioner of Patents, Washington, D. C."*